US012131685B2

(12) United States Patent
Zhao et al.

(10) Patent No.: US 12,131,685 B2
(45) Date of Patent: Oct. 29, 2024

(54) RESETTING CONTROL SIGNAL GENERATION CIRCUITRY, METHOD AND MODULE, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Shuang Zhao, Beijing (CN); Wenbo Chen, Beijing (CN); Zhongliu Yang, Beijing (CN); Chenyu Chen, Beijing (CN); Hongting Lu, Beijing (CN); Jing Yang, Beijing (CN); Yanping Ren, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 275 days.

(21) Appl. No.: 17/765,399

(22) PCT Filed: May 18, 2021

(86) PCT No.: PCT/CN2021/094233
§ 371 (c)(1),
(2) Date: Mar. 30, 2022

(87) PCT Pub. No.: WO2021/244273
PCT Pub. Date: Dec. 9, 2021

(65) Prior Publication Data

US 2022/0375395 A1 Nov. 24, 2022

(30) Foreign Application Priority Data

Jun. 4, 2020 (CN) ........................ 202010498903.2

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0426* (2013.01);
(Continued)

(58) Field of Classification Search
CPC ......... G09G 3/3233; G09G 2300/0426; G09G 2300/0819; G09G 2300/0842;
(Continued)

(56) References Cited

U.S. PATENT DOCUMENTS

2018/0090072 A1 3/2018 Sun
2018/0211590 A1 7/2018 Zhang et al.
(Continued)

FOREIGN PATENT DOCUMENTS

CN 101556778 A 10/2009
CN 105679248 A 6/2016
(Continued)

OTHER PUBLICATIONS

CN 202010498903.2 first office action.
(Continued)

*Primary Examiner* — Benjamin C Lee
*Assistant Examiner* — Nathan P Brittingham
(74) *Attorney, Agent, or Firm* — IPro, PLLC

(57) ABSTRACT

The present disclosure provides a resetting control signal generation circuitry, a resetting control signal generation method, a resetting control signal generation module and a display device. The resetting control signal generation circuitry includes a resetting control signal output end, a first node control circuitry, a second node control circuitry, a first output circuitry and a second output circuitry. The first output circuitry is configured to enable the resetting control
(Continued)

signal output end to be electrically coupled to or electrically decoupled from a first voltage end under the control of a potential at a first node. The second output circuitry is configured to enable the resetting control signal output end to be electrically coupled to or electrically decoupled from a second voltage end under the control of a potential at a second node.

14 Claims, 7 Drawing Sheets

(52) U.S. Cl.
CPC ............... *G09G 2300/0819* (2013.01); *G09G 2300/0842* (2013.01); *G09G 2300/0861* (2013.01); *G09G 2310/061* (2013.01); *G09G 2310/08* (2013.01); *G09G 2330/021* (2013.01)

(58) Field of Classification Search
CPC ..... G09G 2300/0861; G09G 2310/061; G09G 2310/08; G09G 2330/021
See application file for complete search history.

(56) References Cited

U.S. PATENT DOCUMENTS

| | | | | |
|---|---|---|---|---|
| 2019/0378461 | A1 | 12/2019 | Liu | |
| 2020/0184892 | A1* | 6/2020 | Yang .................... | G09G 3/3258 |
| 2021/0193025 | A1 | 6/2021 | Xu et al. | |
| 2021/0200351 | A1 | 7/2021 | Yang et al. | |
| 2021/0366354 | A1* | 11/2021 | Li ......................... | G09G 3/3266 |

FOREIGN PATENT DOCUMENTS

| | | | |
|---|---|---|---|
| CN | 106652901 | A | 5/2017 |
| CN | 106952625 | A | 7/2017 |
| CN | 107170407 | A | 9/2017 |
| CN | 107358914 | A | 11/2017 |
| CN | 108230999 | A | 6/2018 |
| CN | 108597462 | A | 9/2018 |
| CN | 109215585 | A | 1/2019 |
| CN | 109859687 | A | 6/2019 |
| CN | 209265989 | U | 8/2019 |
| CN | 110689848 | A | 1/2020 |
| CN | 110782838 | A | 2/2020 |
| CN | 111243650 | A | 6/2020 |
| CN | 210956110 | U | 7/2020 |
| CN | 111524486 | A | 8/2020 |

OTHER PUBLICATIONS

CN 202010498903.2 second office action.

PCT/CN2021/094233 international search report and written opinion.

* cited by examiner

RESETTING CONTROL SIGNAL GENERATION CIRCUITRY, METHOD AND MODULE, AND DISPLAY DEVICE

CROSS-REFERENCE TO RELATED APPLICATION

This application is the U.S. national phase of PCT Application No. PCT/CN2021/094233 filed on May 18, 2021, which claims a priority of the Chinese patent application No. 202010498903.2 filed on Jun. 4, 2020, which is incorporated herein by reference in its entirety.

TECHNICAL FIELD

The present disclosure relates to the field of display technology, in particular to a resetting control signal generation circuitry, a resetting control signal generation method, a resetting control signal generation module and a display device.

BACKGROUND

A PCV mode is adopted to prolong a service life of an Organic Light-Emitting Diode (OLED) device. In the PCV mode, a low voltage is applied to reset an anode of an OLED, the voltage is maintained for a period of time through a resetting control switch, the resetting control switch is turned on when a light-emission control transistor is turned off, and the resetting control switch is turned off when the light-emission control transistor is turned on. However, in the related art, a pulse time for controlling the resetting control switch to be turned on is too short to maintain the voltage for resetting the anode.

SUMMARY

An object of the present disclosure is to provide a resetting control signal generation circuitry, a resetting control signal generation method, a resetting control signal generation module and a display device, so as to solve the problem in the related art where the pulse time for controlling the resetting control switch to be turned on is too short to maintain the voltage for resetting the anode.

In one aspect, the present disclosure provides in some embodiments a resetting control signal generation circuitry, including a resetting control signal output end, a first node control circuitry, a second node control circuitry, a first output circuitry and a second output circuitry. The first node control circuitry is configured to control a potential at a first node and maintain the potential at the first node; the second node control circuitry is configured to control a potential at a second node and maintain the potential at the second node; the first output circuitry is electrically coupled to the first node, the resetting control signal output end and a first voltage end, and configured to enable the resetting control signal output end to be electrically coupled to or electrically decoupled from the first voltage end under the control of the potential at the first node; the second output circuitry is electrically coupled to the second node, the resetting control signal output end and a second voltage end, and configured to enable the resetting control signal output end to be electrically coupled to or electrically decoupled from the second voltage end under the control of the potential at the second node, and the first output circuitry includes a first output transistor and an output capacitor; a control electrode of the first output transistor is electrically coupled to the first node, a first electrode of the first output transistor is electrically coupled to the first voltage end, and a second electrode of the first output transistor is electrically coupled to the resetting control signal output end; a first end of the output capacitor is electrically coupled to the first node, and a second end of the output capacitor is electrically coupled to the first voltage end; the second output circuitry includes a second output transistor, a control electrode of the second output transistor is electrically coupled to the second node, a first electrode of the second output transistor is electrically coupled to the resetting control signal output end, and a second electrode of the second output transistor is electrically coupled to the second voltage end; and the first voltage end is a low voltage end, and the second voltage end is a high voltage end.

In a possible embodiment of the present disclosure, the first node control circuitry is electrically coupled to a first clock signal end, a second clock signal end, the first node, the second node, a third node, the first voltage end and the second voltage end, and configured to control a potential at the third node in accordance with a first voltage signal and a first clock signal under the control of the first clock signal and the potential at the second node, control the potential at the first node in accordance with a second voltage signal under the control of the potential at the third node, a second clock signal and the potential at the second node, and maintain the potential at the first node. The first voltage end is configured to provide the first voltage signal, the second voltage end is configured to provide the second voltage signal. The second node control circuitry is electrically coupled to the third node, the first clock signal end, an initial voltage end, the second clock signal end, the second node and the second voltage end, and configured to control the potential at the second node in accordance with the second clock signal, an initial voltage signal and the second voltage signal under the control of the first clock signal, the second clock signal, and the potential at the third node. The initial voltage end is configured to provide the initial voltage signal.

In a possible embodiment of the present disclosure, the first node control circuitry includes a third node control sub-circuitry, a fourth node control sub-circuitry, and a first node control sub-circuitry. The third node control sub-circuitry is electrically coupled to the first clock signal end, the first voltage end, the second node, and the third node, and configured to write the first voltage signal into the third node under the control of the first clock signal and write the first clock signal into the third node under the control of the potential at the second node; the fourth node control sub-circuitry is electrically coupled to the third node, the fourth node and the second clock signal end, and configured to write the second clock signal into the fourth node under the control of the potential at the third node and control a potential at the fourth node in accordance with the potential at the third node; and the first node control sub-circuitry is electrically coupled to the fourth node, the second clock signal end and the first node, and configured to enable the fourth node to be electrically coupled to or electrically decoupled from and the first node under the control of the second clock signal and maintain the potential at the first node.

In a possible embodiment of the present disclosure, the third node control sub-circuitry includes a first control transistor and a second control transistor. A control electrode of the first control transistor is electrically coupled to the first clock signal end, a first electrode of the first control transistor is electrically coupled to the first voltage end, and a second electrode of the first control transistor is electrically coupled to the third node; and a control electrode of the second control transistor is electrically coupled to the second node, a first electrode of the second control transistor is electrically coupled to the third node, and a second electrode of the second control transistor is electrically coupled to the first clock signal end.

In a possible embodiment of the present disclosure, the fourth node control sub-circuitry includes a third control transistor and a first capacitor; a control electrode of the third control transistor is electrically coupled to the third node, a first electrode of the third control transistor is electrically coupled to the second clock signal end, and a second electrode of the third control transistor is electrically coupled to the fourth node; and a first end of the first capacitor is electrically coupled to the third node, and a second end of the first capacitor is electrically coupled to the fourth node.

In a possible embodiment of the present disclosure, the first node control sub-circuitry includes a fourth control transistor and a fifth control transistor. A control electrode of the fourth control transistor is electrically coupled to the second clock signal end, a first electrode of the fourth control transistor is electrically coupled to the fourth node, and a second electrode of the fourth control transistor is electrically coupled to the first node; and a control electrode of the fifth control transistor is electrically coupled to a second node, a first electrode of the fifth control transistor is electrically coupled to the first node, and a second electrode of the fifth control transistor is electrically coupled to the second voltage end.

In a possible embodiment of the present disclosure, the second node control circuitry includes a sixth control transistor, a seventh control transistor, an eighth control transistor and a third capacitor. A control electrode of the sixth control transistor is electrically coupled to the first clock signal end, a first electrode of the sixth control transistor is electrically coupled to the initial voltage end, and a second electrode of the sixth control transistor is electrically coupled to the second node; a control electrode of the seventh control transistor is electrically coupled to the third node, and a first electrode of the seventh control transistor is electrically coupled to the second voltage end; a control electrode of the eighth control transistor is electrically coupled to the second clock signal end, a first electrode of the eighth control transistor is electrically coupled to a second electrode of the seventh control transistor, and a second electrode of the eighth control transistor is electrically coupled to the second node; and a first end of the third capacitor is electrically coupled to the second node, and a second end of the third capacitor is electrically coupled to the second clock signal end.

In another aspect, the present disclosure provides in some embodiments a resetting control signal generation method for the above-mentioned resetting control signal generation circuitry, including: controlling, by the first node control circuitry, the potential at the first node and maintaining the potential at the first node; controlling, by the second node control circuitry, the potential at the second node and maintaining the potential at the second node; enabling, by the first output circuitry, the resetting control signal output end to be electrically coupled to or electrically decoupled from the first voltage end under the control of the potential at the first node; and enabling, by the second output circuitry, the resetting control signal output end to be electrically coupled to or electrically decoupled from the second voltage end under the control of the potential at the second node.

In yet another aspect, the present disclosure provides in some embodiments a resetting control signal generation module, including a plurality of levels of the above-mentioned resetting control signal generation circuitries.

In still yet another aspect, the present disclosure provides in some embodiments a display device, includes the above-mentioned resetting control signal generation module.

In a possible embodiment of the present disclosure, the display device further includes a light-emission control signal generation module and a plurality of pixel circuitries arranged in rows and columns. Each pixel circuitry is electrically coupled to a light-emission control line and a first resetting control line, and the light-emission control signal generation module is configured to provide a light-emission control signal to the pixel circuitry, the resetting control signal generation module is configured to provide a first resetting control signal to the pixel circuitry, and the first resetting control signal is in inverse phase with the light-emission control signal.

In a possible embodiment of the present disclosure, the pixel circuitry includes a driving circuitry, a light-emission control circuitry, a first resetting circuitry, a second resetting circuitry, a data writing circuitry, an energy storage circuitry, a compensation circuitry and a light-emitting element. The light-emission control circuitry is electrically coupled to the light-emission control line, a third voltage end, a first end of the driving circuitry, a second end of the driving circuitry and a first electrode of the light-emitting element, and configured to enable the third voltage end to be electrically coupled to the first end of the driving circuitry and enable the second end of the driving circuitry to be electrically coupled to the first electrode of the light-emitting element under the control of the light-emission control signal from the light-emission control line; the first resetting circuitry is electrically coupled to the first resetting control line, the first electrode of the light-emitting element and a first initial voltage end, and configured to write a first initial voltage into the first electrode of the light-emitting element under the control of the first resetting control signal provided by the first resetting control line, and the first initial voltage end is configured to provide the first initial voltage; the second resetting circuitry is electrically coupled to a second resetting control line, a control end of the driving circuitry and a second initial voltage end, and configured to write a second initial voltage into the control end of the driving circuitry under the control of a second resetting control signal from the second resetting control line, and the second initial voltage end is configured to provide the second initial voltage; the data writing circuitry is configured to write a data voltage into the first end of the driving circuitry under the control of a gate driving signal; the compensation circuitry is configured to enable the control end of the driving circuitry to be electrically coupled to or electrically decoupled from the second end of the driving circuitry under the control of the gate driving signal; the driving circuitry is configured to generate a driving current in accordance with a potential at the control end of the driving circuitry; and the energy storage circuitry is configured to maintain the potential at the control end of the driving circuitry.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
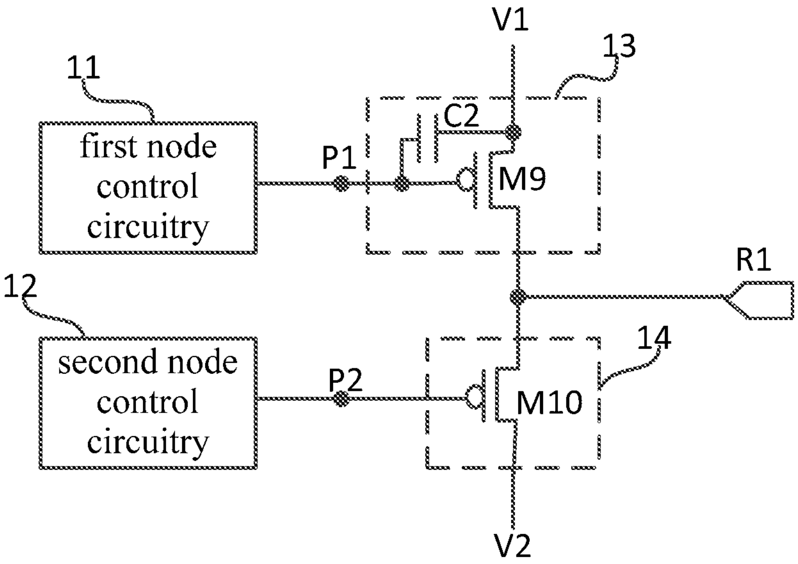
FIG. 1 is a schematic view showing a resetting control signal generation circuitry according to one embodiment of the present disclosure.

As shown in FIG. 1, the present disclosure provides in some embodiments a resetting control signal generation circuitry, including a resetting control signal output end R1, a first node control circuitry 11, a second node control circuitry 12, a first output circuitry 13 and a second output circuitry 14. The first node control circuitry 11 is electrically coupled to a first node P1, and configured to control a potential at the first node P1 and maintain the potential at the first node P1; the second node control circuitry 12 is configured to control a potential at a second node P2 and maintain the potential at the second node; the first output circuitry 13 is electrically coupled to the first node P1, the resetting control signal output end R1 and a first voltage end V1, and configured to enable the resetting control signal output end R1 to be electrically coupled to or electrically decoupled from the first voltage end V1 under the control of the potential at the first node P1; the second output circuitry 14 is electrically coupled to the second node P2, the resetting control signal output end R1 and a second voltage end V2, and configured to enable the resetting control signal output end R1 to be electrically coupled to or electrically decoupled from the second voltage end V2 under the control of the potential at the second node P2; the first output circuitry 13 includes a first output transistor M9 and an output capacitor C2; the second output circuitry 14 includes a second output transistor M10; a gate electrode of M9 is electrically coupled to the first node P1, a source electrode of M9 is electrically coupled to the first voltage end V1, and a drain electrode of M9 is electrically coupled to the resetting control signal output end R1; a first end of the C2 is electrically coupled to the first node P1, and a second end of C2 is electrically coupled to the first voltage end V1; a gate electrode of M10 is electrically coupled to the second node P2, a source electrode of M10 is electrically coupled to the resetting control signal output end R1, and a drain electrode of M10 is electrically coupled to the second voltage end V2; and the first voltage end V1 is a low voltage end, and the second voltage end V2 is a high voltage end.

In the embodiments of the present disclosure, as shown in FIG. 1, M9 and M10 are, but not limited to, p-type Metal-Oxide-Semiconductor (PMOS) transistors.

In the embodiments of the present disclosure, the resetting control signal generation circuitry generates a resetting control signal in inverse phase with a light-emission control signal.

In the embodiments of the present disclosure, a first voltage is, but not limited to, a low voltage, and a second voltage is, but not limited to, a high voltage.

In the embodiments of the present disclosure, as shown in FIG. 1, during the operation of the resetting control signal generation circuitry, at a non-light-emitting phase, the second node control circuitry 12 controls the potential at the second node P2 to be the second voltage, the first node control circuitry 11 controls the potential at the first node P1 to be the first voltage, the first output circuitry 13 enables R1 to be electrically coupled to V1 under the control of the potential at the first node P1, and the second output circuitry 14 enables R1 to be electrically decoupled from V2 under the control of the potential at the second node P2, so R1 outputs the first voltage. At a light-emitting phase, the second node control circuitry 12 controls the potential at the second node P2 to be the first voltage, the first node control circuitry 11 controls the potential at the first node P1 to be the second voltage, the first output circuitry 13 enables R1 to be electrically decoupled from V1 under the control of the potential at the first node P1, and the second output circuitry 14 enables R1 to be electrically coupled to V2 under the control of the potential at the second node P2, so R1 outputs the second voltage.

Figure 2:
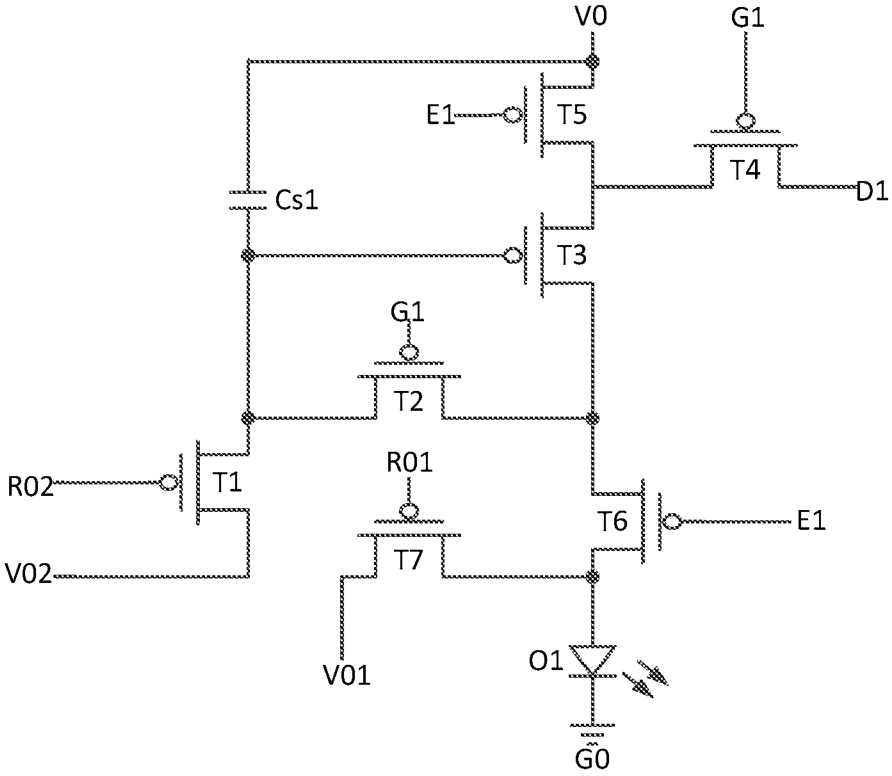
FIG. 2 is a circuit diagram of a pixel circuitry according to one embodiment of the present disclosure.

In the embodiments of the present disclosure, the resetting control signal generation circuitry is applied to a pixel circuitry. As shown in FIG. 2, the pixel circuitry includes a first transistor T1, a second transistor T2, a third transistor T3, a fourth transistor T4, a fifth transistor T5, a sixth transistor T6, a seventh transistor T7, a first storage capacitor Cs1, and an organic light-emitting diode O1. A gate electrode of T7 is electrically coupled to R01, a gate electrode of T1 is electrically coupled to R02, and a gate electrode of T5 and a gate electrode of T6 are both electrically coupled to E1. In FIG. 2, E1 is a light-emission control line, R01 is a first resetting control line, R02 is a second resetting control line, V01 is a first initial voltage, and V02 is a second initial voltage; G1 is a gate line, D1 is a data line, V0 is a power supply voltage, and G0 is a grounded end.

As shown in FIG. 2, an anode of O1 is electrically coupled to T6, and a cathode of O1 is electrically coupled to the grounded end G0.

In the embodiments of the present disclosure, the resetting control signal generated by the resetting control signal generation circuitry is a first resetting control signal applied to the first resetting control line R01.

In the embodiments of the present disclosure, as shown in FIG. 2, all the transistors in each pixel circuitry are, but not limited to, PMOS transistors.

In the embodiments of the present disclosure, as shown in FIG. 2, During the operation of the pixel circuitry, a potential at the anode of O1 is reset by T7 controlled by R01, T7 needs to be turned on for a period of time to stabilize the potential at the anode of O1 when T5 and T6 are turned off, and then T7 is turned off when T5 and T6 are turned on. However, in the related art, T7 is maintained in an on state for a too short period of time under the control of the resetting control signal, so it is impossible to maintain a voltage at the anode of O1. Based on above, in the embodiments of the present disclosure, a resetting control signal in inverse phase with a light-emission control signal is generated, so as to increase the period of time within which T7 is turned on in such a manner as to maintain the voltage for resetting the anode of O1, thereby to ensure that T7 is turned off when the light-emission control transistor (i.e., T5 and T6) are turned on.

During the implementation, the first node control circuitry is electrically coupled to a first clock signal end, a second clock signal end, the first node, the second node, a third node, the first voltage end and the second voltage end, and configured to control a potential at the third node in accordance with a first voltage signal and a first clock signal under the control of the first clock signal and the potential at the second node, control the potential at the first node in accordance with a second voltage signal under the control of the potential at the third node, a second clock signal and the potential at the second node, and maintain the potential at the first node. The first voltage end is configured to provide the first voltage signal, the second voltage end is configured to provide the second voltage signal. The second node control circuitry is electrically coupled to the third node, the first clock signal end, an initial voltage end, the second clock signal end, the second node and the second voltage end, and configured to control the potential at the second node in accordance with the second clock signal, an initial voltage signal and the second voltage signal under the control of the first clock signal, the second clock signal, and the potential at the third node. The initial voltage end is configured to provide the initial voltage signal.

Figure 3:
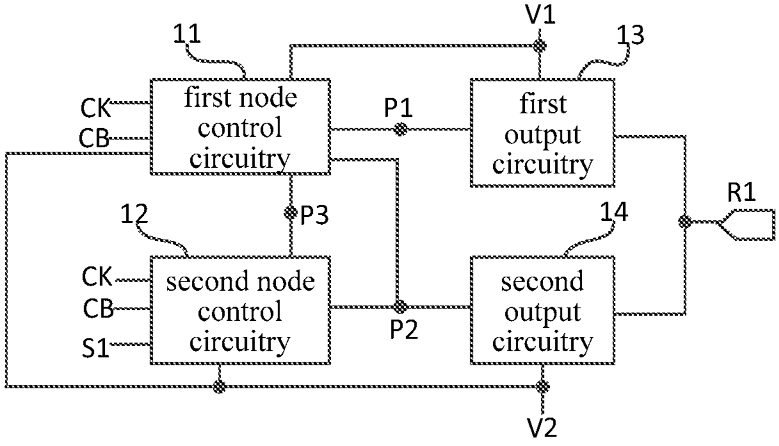
FIG. 3 is another schematic view showing the resetting control signal generation circuitry according to one embodiment of the present disclosure.

As shown in FIG. 3, based on the resetting control signal generation circuitry in FIG. 1, the first node control circuitry 11 is electrically coupled to the first clock signal end, the second clock signal end, the first node P1, the second node P2, the third node P3, the first voltage end V1 and the second voltage end V2. The first node control circuitry 11 is configured to control the potential at the third node P3 in accordance with the first voltage signal and the first clock signal CK under the control of the first clock signal CK and the potential at the second node P2, control the potential at the first node P1 in accordance with the second voltage signal under the control of the potential at the third node P3, a second clock signal CB and the potential at the second node P2, and maintain the potential at the first node P1. The first voltage end V1 is configured to provide the first voltage signal, the second voltage end V2 is configured to provide the second voltage signal. The first clock signal end is configured to provide the first clock signal CK, and the second clock signal end is configured to provide the second clock signal CB. The second node control circuitry 12 is electrically coupled to the third node P3, the first clock signal end, an initial voltage end S1, the second clock signal end, the second node P2 and the second voltage end V2, and configured to control the potential at the second node P2 in accordance with the second clock signal CB, an initial voltage signal and the second voltage signal under the control of the first clock signal CK, the second clock signal CB, and the potential at the third node P3. The initial voltage end S1 is configured to provide the initial voltage signal.

In the embodiments of the present disclosure, as shown in FIG. 3, During the operation of the resetting control signal generation circuitry, the first node control circuitry 11 controls the potential at the third node P3, controls the potential at the first node P1 under the control of the potential at P3, CB and the potential at P2, and maintains the potential at first node P1. The second node control circuitry 12 controls the potential at the second node P2 in accordance with CB, the initial voltage signal, and the second voltage signal under the control of CK, CB, and the potential at P3.

In the embodiments of the present disclosure, the first node control circuitry includes a third node control sub-circuitry, a fourth node control sub-circuitry, and a first node control sub-circuitry. The third node control sub-circuitry is electrically coupled to the first clock signal end, the first voltage end, the second node, and the third node, and configured to write the first voltage signal into the third node under the control of the first clock signal and write the first clock signal into the third node under the control of the potential at the second node. The fourth node control sub-circuitry is electrically coupled to the third node, the fourth node and the second clock signal end, and configured to write the second clock signal into the fourth node under the control of the potential at the third node and control a potential at the fourth node in accordance with the potential at the third node. The first node control sub-circuitry is electrically coupled to the fourth node, the second clock signal end and the first node, and configured to enable the fourth node to be electrically coupled to or electrically decoupled from and the first node under the control of the second clock signal, and maintain the potential at the first node.

During the implementation, the first node control circuitry includes the third node control sub-circuitry, the fourth node control sub-circuitry, and the first node control sub-circuitry. The third node control sub-circuitry controls the potential at the third node, the fourth node control sub-circuitry controls the potential at the fourth node under the control of the potential at the third node, and the first node control sub-circuitry controls the potential at the first node in accordance with the potential at the fourth node and maintains the potential at the first node.

Figure 4:
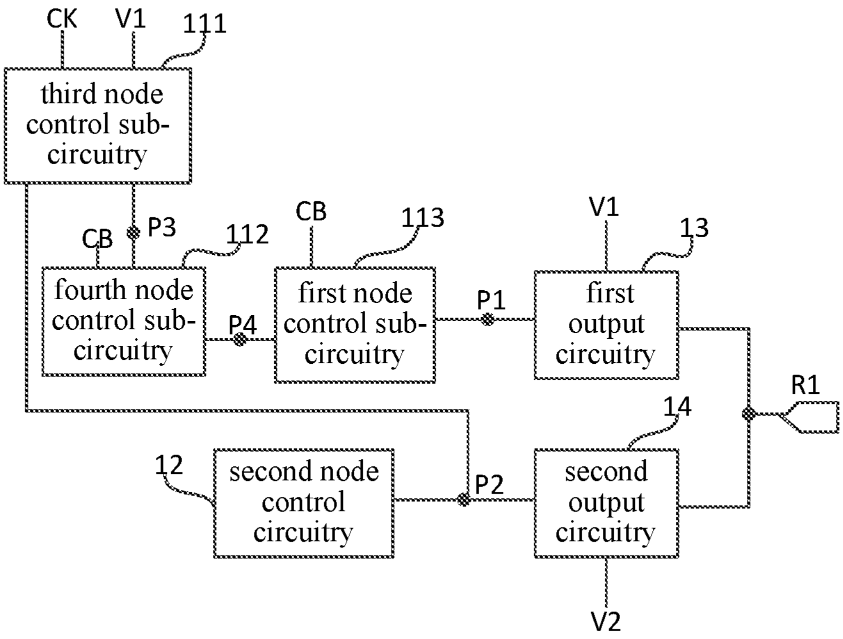
FIG. 4 is yet another schematic view showing the resetting control signal generation circuitry according to one embodiment of the present disclosure.

As shown in FIG. 4, based on the resetting control signal generation circuitry in FIG. 3, the first node control circuitry includes a third node control sub-circuitry 111, a fourth node control sub-circuitry 112, and a first node control sub-circuitry 113. The third node control sub-circuitry 111 is electrically coupled to the first clock signal end, the first voltage end V1, the second node P2, and the third node P3, and configured to write the first voltage signal into the third node P3 under the control of the first clock signal CK and write the first clock signal CK into the third node P3 under the control of the potential at the second node P2. The first voltage end V1 is configured to the first voltage signal. The fourth node control sub-circuitry 112 is electrically coupled to the third node P3, the fourth node P4 and the second clock signal end, and configured to write the second clock signal CB into the fourth node P4 under the control of the potential at the third node P3 and control a potential at the fourth node P4 in accordance with the potential at the third node P3. The first node control sub-circuitry 113 is electrically coupled to the fourth node P4, the second clock signal end and the first node P1, and configured to enable the fourth node P4 to be electrically coupled to or electrically decoupled from and the first node P1 under the control of the second clock signal CB and maintain the potential at the first node P1.

In the embodiments of the present disclosure, as shown in FIG. 4, during the operation of the resetting control signal generation circuitry, the third node control sub-circuitry 111 controls the potential at the third node P3, the fourth node control sub-circuitry 112 controls the potential at the fourth node P4 under the control of the potential at the third node P3, and the first node control sub-circuitry 113 controls the potential at the first node P1 in accordance with the potential at the fourth node P4 and maintains the potential at the first node P1.

In a possible embodiment of the present disclosure, the third node control sub-circuitry includes a first control transistor and a second control transistor. A control electrode of the first control transistor is electrically coupled to the first clock signal end, a first electrode of the first control transistor is electrically coupled to the first voltage end, and a second electrode of the first control transistor is electrically coupled to the third node. A control electrode of the second control transistor is electrically coupled to the second node, a first electrode of the second control transistor is electrically coupled to the third node, and a second electrode of the second control transistor is electrically coupled to the first clock signal end.

In a possible embodiment of the present disclosure, the fourth node control sub-circuitry includes a third control transistor and a first capacitor. A control electrode of the third control transistor is electrically coupled to the third node, a first electrode of the third control transistor is electrically coupled to the second clock signal end, and a second electrode of the third control transistor is electrically coupled to the fourth node. A first end of the first capacitor is electrically coupled to the third node, and a second end of the first capacitor is electrically coupled to the fourth node.

In a possible embodiment of the present disclosure, the first node control sub-circuitry includes a fourth control transistor and a fifth control transistor. A control electrode of the fourth control transistor is electrically coupled to the second clock signal end, a first electrode of the fourth control transistor is electrically coupled to the fourth node, and a second electrode of the fourth control transistor is electrically coupled to the first node. A control electrode of the fifth control transistor is electrically coupled to a second node, a first electrode of the fifth control transistor is electrically coupled to the first node, and a second electrode of the fifth control transistor is electrically coupled to the second voltage end.

In a possible embodiment of the present disclosure, the second node control circuitry includes a sixth control transistor, a seventh control transistor, an eighth control transistor and a third capacitor. A control electrode of the sixth control transistor is electrically coupled to the first clock signal end, a first electrode of the sixth control transistor is electrically coupled to the initial voltage end, and a second electrode of the sixth control transistor is electrically coupled to the second node. A control electrode of the seventh control transistor is electrically coupled to the third node, and a first electrode of the seventh control transistor is electrically coupled to the second voltage end. A control electrode of the eighth control transistor is electrically coupled to the second clock signal end, a first electrode of the eighth control transistor is electrically coupled to a second electrode of the seventh control transistor, and a second electrode of the eighth control transistor is electrically coupled to the second node. A first end of the third capacitor is electrically coupled to the second node, and a second end of the third capacitor is electrically coupled to the second clock signal end.

Figure 5:
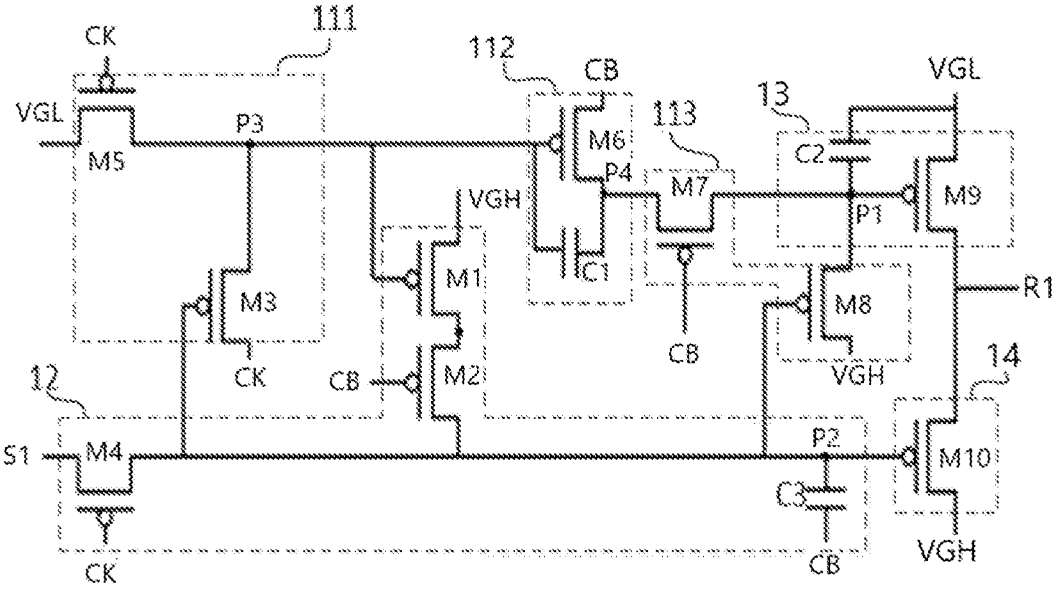
FIG. 5 is a circuit diagram of the resetting control signal generation circuitry according to one embodiment of the present disclosure.

As shown in FIG. 5, in the embodiments of the present disclosure, the resetting control signal generation circuitry includes a resetting control signal output end R1, a first node control circuitry, a second node control circuitry 12, a first output circuitry 13 and a second output circuitry 14. The first output circuitry 13 includes a first output transistor M9 and an output capacitor C2, and the second output circuitry 14 includes a second output transistor M10. A gate electrode of M9 is electrically coupled to the first node P1, a source electrode of M9 is electrically coupled to a low voltage end, and a drain electrode of M9 is electrically coupled to a resetting control signal output end R1. A first end of C2 is electrically coupled to the first node P1, and a second end of C2 is electrically coupled to the low voltage end. A gate electrode of M10 is electrically coupled to the second node P2, a source electrode of M10 is electrically coupled to the resetting control signal output end R1, and a drain electrode of M10 is electrically coupled to a high voltage end. The first node control circuitry includes a third node control sub-circuitry 111, a fourth node control sub-circuitry 112, and a first node control sub-circuitry 113.

The third node control sub-circuitry 111 includes a first control transistor M5 and a second control transistor M3. A gate electrode of the first control transistor M5 is electrically coupled to the first clock signal end, a source electrode of the first control transistor M5 is electrically coupled to the low voltage end, a drain electrode of the first control transistor M5 is electrically coupled to the third node, and the first clock signal end is configured to provide the first clock signal CK, and the low voltage end is configured to provide the low voltage VGL. A gate electrode of the second control transistor M3 is electrically coupled to the second node P2, a source electrode of the second control transistor M3 is electrically coupled to the third node P3, and a drain electrode of the second control transistor M3 is electrically coupled to the first clock signal end.

The fourth node control sub-circuitry 112 includes a third control transistor M6 and a first capacitor C1. A gate electrode of the third control transistor M6 is electrically coupled to the third node P3, a source electrode of the third control transistor M6 is electrically coupled to the second clock signal end, a drain electrode of the third control transistor M6 is electrically coupled to the fourth node P4, and the second clock signal end is configured to provide the second clock signal CB. A first end of the first capacitor C1 is electrically coupled to the third node P3, and a second end of the first capacitor C1 is electrically coupled to the fourth node P4.

The first node control sub-circuitry 113 includes a fourth control transistor M7 and a fifth control transistor M8. A gate electrode of the fourth control transistor M7 is electrically coupled to the second clock signal end, a source electrode of the fourth control transistor M7 is electrically coupled to the fourth node P4, and a drain electrode of the fourth control transistor M7 is electrically coupled to the first node P1. A gate electrode of the fifth control transistor M8 is electrically coupled to the second node P2, a source electrode of the fifth control transistor M8 is electrically coupled to the first node P1, a drain electrode of the fifth control transistor M8 is electrically coupled to the high voltage end, and the high voltage end is configured to provide a high voltage VGH.

The second node control circuitry 12 includes a sixth control transistor M4, a seventh control transistor M1, an eighth control transistor M2, and a third capacitor C3. A gate electrode of the sixth control transistor M4 is electrically coupled to the first clock signal end, a source electrode of the sixth control transistor M4 is electrically coupled to the initial voltage end S1, and a drain electrode of the sixth control transistor M4 is electrically coupled to the second node P2. A gate electrode of the seventh control transistor M1 is electrically coupled to the third node P3, and a source electrode of the seventh control transistor M1 is electrically coupled to the high voltage end. A gate electrode of the eighth control transistor M2 is electrically coupled to the second clock signal end, a source electrode of the eighth control transistor M2 is electrically coupled to a drain electrode of the seventh control transistor M1, and a drain electrode of the eighth control transistor M2 is electrically coupled to the second node P2. A first end of the third capacitor C3 is electrically coupled to the second node P2, and a second end of the third capacitor C2 is electrically coupled to a second clock signal end.

In the embodiments of the present disclosure, the first voltage end is the low voltage end, and the second voltage end is the high voltage end.

In the embodiments of the present disclosure, as shown in FIG. 5, all the transistors are, but not limited to, PMOS transistors.

Figure 6:
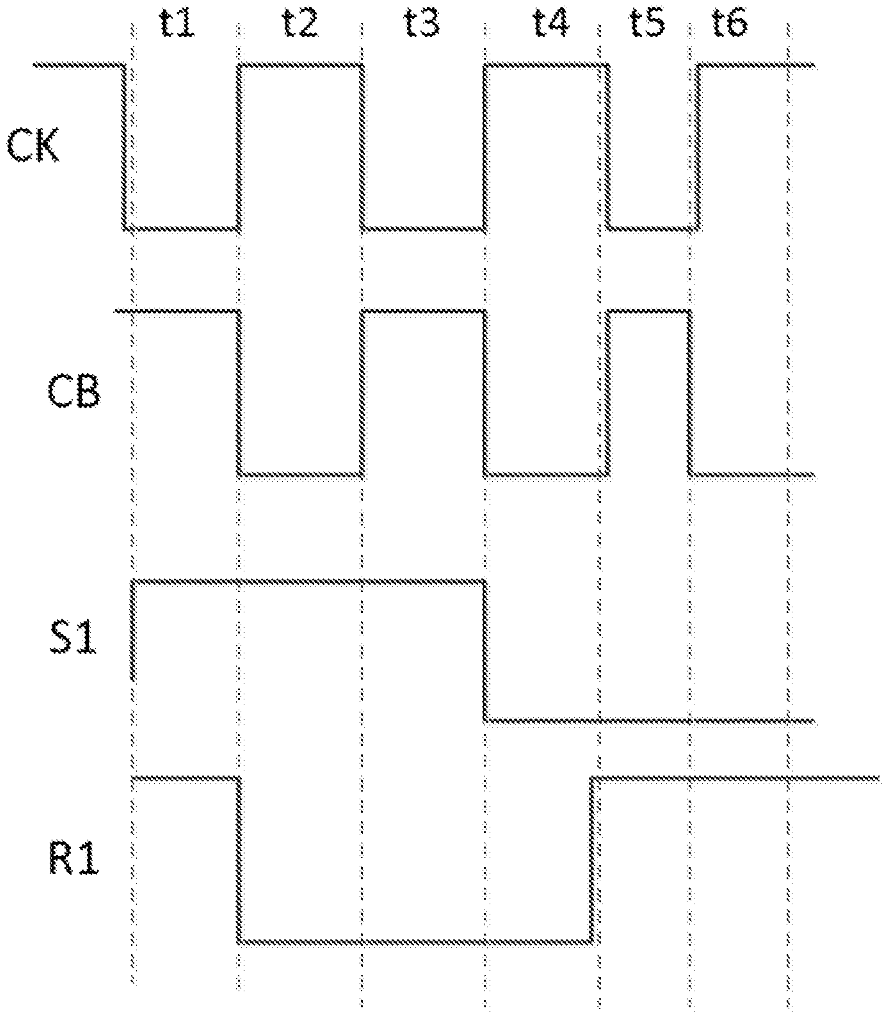
FIG. 6 is a sequence diagram of the resetting control signal generation circuitry in FIG. 5 according to one embodiment of the present disclosure.

As shown in FIG. 6, in the embodiments of the present disclosure, during the operation of the resetting control signal generation circuitry in FIG. 5, at a first phase t1, CK is a low voltage, CB is a high voltage, and S1 provides a high voltage, so M5 is turned on. The potential at P3 is a low voltage, so M6 is turned on. The potential at P4 is a high voltage, so M7 is turned off, M4 is turned on. The potential at P2 is a high voltage, and the potential at P1 is maintained as a high voltage, so M9 and M10 are both turned off. At this time, R1 continues to output a high voltage.

At a second phase t2, CK is a high voltage, CB is a low voltage, and S1 provides a high voltage, so M5 is turned off, and M4 is turned off. The potential at P3 is maintained as a low voltage, so M1 and M2 are both turned on. The potential at P2 is a high voltage, so M6 is turned on. The potential at P4 is a low voltage, so M7 is turned on. The potential at P1 is a low voltage, so M9 is turned on and M10 is turned off. At this time, R1 outputs a low voltage.

At a third phase t3, CK is a low voltage, CB is a high voltage, and S1 provides a high voltage, so M4 and M5 are both turned on. The potential at P3 is a low voltage, and the potential at P2 is a high voltage, so M3 is turned off, and M6 is turned on. The potential at P4 is a high voltage, so M7 is turned off. The potential at P1 is maintained as a low voltage, so M9 is turned on and M10 is turned off. At this time, R1 outputs a low voltage.

At a fourth phase t4, CK is a high voltage, CB is a low voltage, and S1 provides a low voltage, so M4 and M5 are both turned off. The potential at P3 is maintained as a low voltage, so M1 and M2 are both turned on. The potential at P2 is a high voltage, so M6 is turned on. The potential at P4 is a low voltage, so M7 is turned on. The potential at P1 is a low voltage, so M9 is turned on, and M10 is turned off. At this time, R1 outputs a low voltage.

At a fifth phase t5, CK is a low voltage, CB is a high voltage, and S1 provides a low voltage, so M4 and M5 are both turned on. The potential at P3 is a low voltage, so M6 is turned on. The potential at P4 is a high voltage, and the potential at P2 is a low voltage, so M8 is turned on. The potential at P1 is a high voltage, so M9 is turned off, and M10 is fully turned on. At this time, R1 outputs a high voltage.

At a sixth phase t6, CK is a high voltage, CB is a low voltage, and S1 provides a low voltage, so M4 and M5 are both turned off, and M3 is turned on. The potential at P3 is a high voltage, so M1 and M6 are both turned off. The potential at P4 is a high voltage, so M7 is turned on. The potential at P1 is a high voltage, so M8 is turned on. The potential at P2 is a low voltage, so M10 is turned on, and M9 is turned off. At this time, R1 outputs a high voltage.

Figure 7:
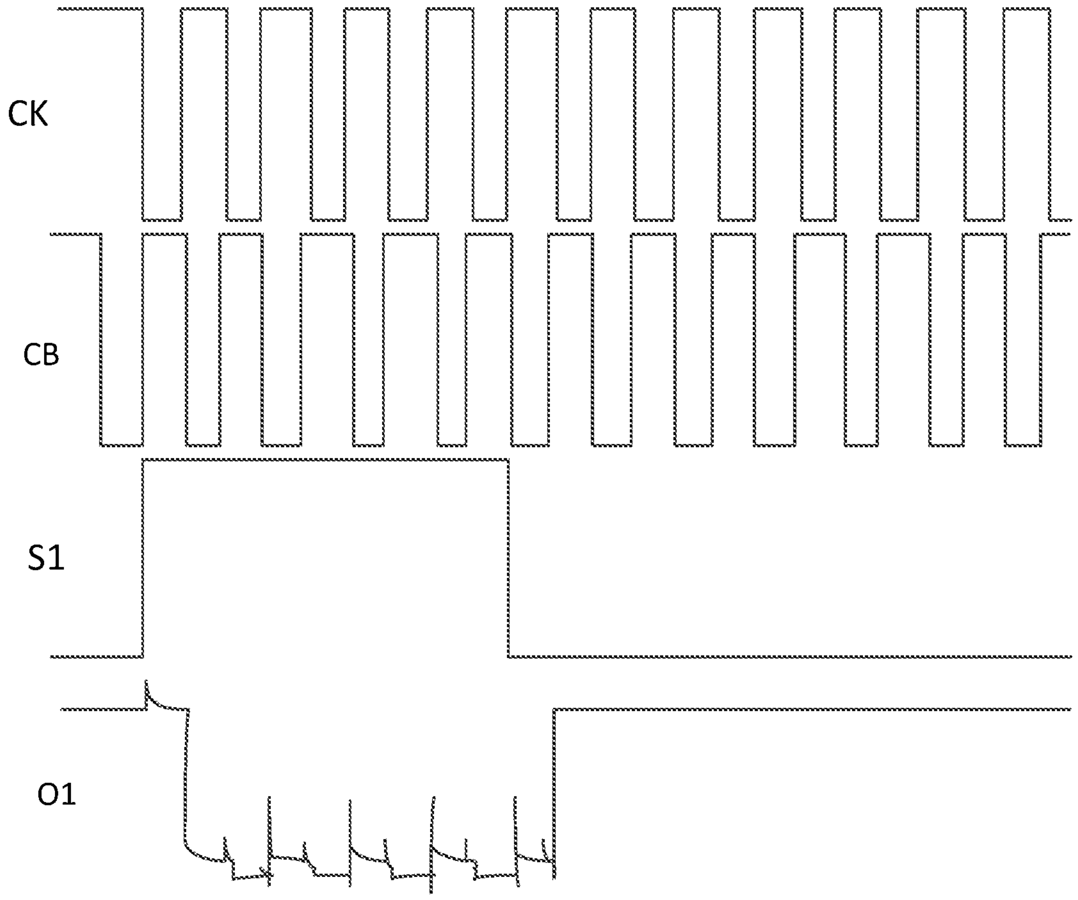
FIG. 7 is a simulation sequence diagram of the resetting control signal generation circuitry in FIG. 5.

FIG. 7 shows a simulation sequence diagram of the resetting control signal generation circuitry in FIG. 5.

The present disclosure further provides in some embodiments a resetting control signal generation method for the above-mentioned resetting control signal generation circuitry, including: controlling, by the first node control circuitry, the potential at the first node and maintaining the potential at the first node; controlling, by the second node control circuitry, the potential at the second node and maintaining the potential at the second node; enabling, by the first output circuitry, the resetting control signal output end to be electrically coupled to or electrically decoupled from the first voltage end under the control of the potential at the first node; and enabling, by the second output circuitry, the resetting control signal output end to be electrically coupled to or electrically decoupled from the second voltage end under the control of the potential at the second node.

The present disclosure further provides in some embodiments a resetting control signal generation module, including a plurality of levels of the above-mentioned resetting control signal generation circuitry.

The present disclosure further provides in some embodiments a display device, includes the above-mentioned resetting control signal generation module.

In the embodiments of the present disclosure, the display device further includes a light-emission control signal generation module and a plurality of pixel circuitries arranged in rows and columns. Each pixel circuitry is electrically coupled to a light-emission control line and a first resetting control line, and the light-emission control signal generation module is configured to provide a light-emission control signal to the pixel circuitry, the resetting control signal generation module is configured to provide a first resetting control signal to the pixel circuitry, and the first resetting control signal is in inverse phase with the light-emission control signal.

During the implementation, the display device further includes the light-emission control signal generation module and the plurality of pixel circuitries arranged in rows and columns. The light-emission control signal generation module is configured to provide the light-emission control signal to the pixel circuitry, the resetting control signal generation module is configured to provide the first resetting control signal to the pixel circuitry, and the first resetting control signal is in inverse phase with the light-emission control signal.

Figure 8:
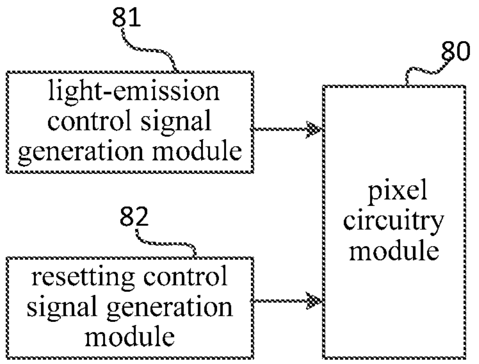
FIG. 8 is a schematic view showing a structural relationship among a pixel circuitry module 80, a light-emission control signal generation module 81, and a resetting control signal generation module 82 according to one embodiment of the present disclosure.

As shown in FIG. 8, 80 represents a pixel circuitry module including a plurality of pixel circuitries arranged in rows and columns. The light-emission control signal generation module 81 provides the light-emission control signal to the pixel circuitry in the pixel circuitry module 80, the resetting control signal generation module 82 provides the first resetting control signal to the pixel circuitry in the pixel circuitry module 80, and the light-emission control signal is in inverse phase with the first resetting control signal.

Figure 9:
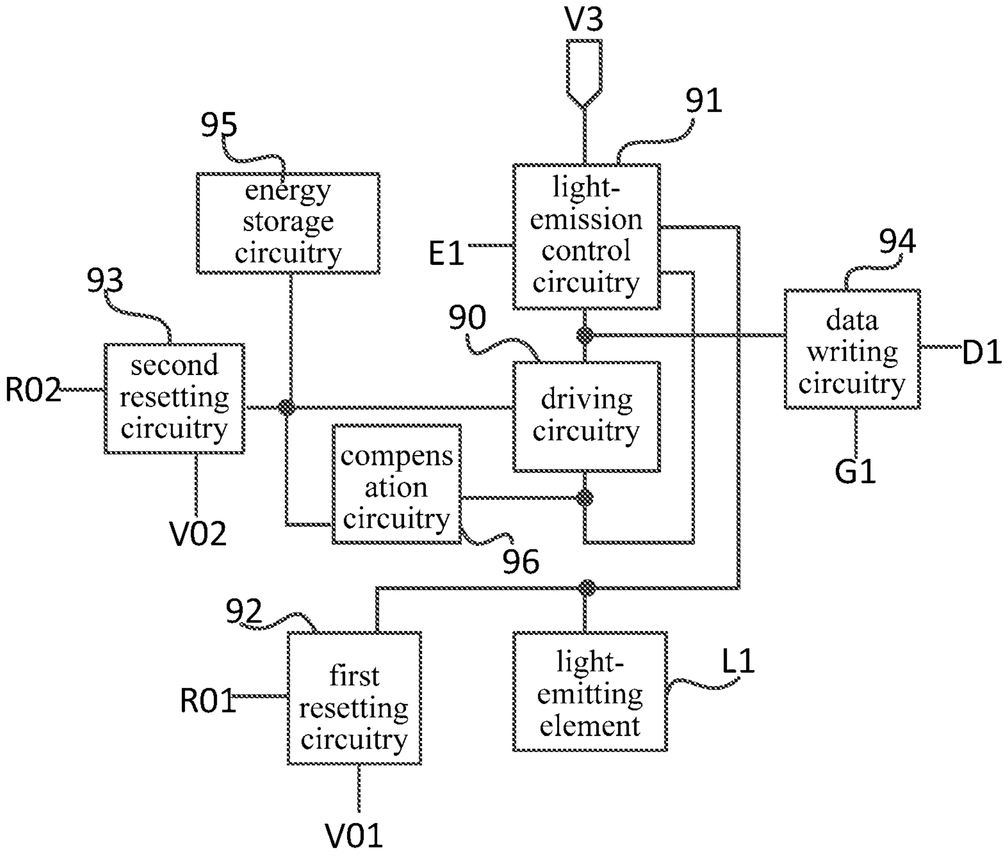
FIG. 9 is a schematic view showing a pixel circuitry in a display device according to one embodiment of the present disclosure.

As shown in FIG. 9, in the embodiments of the present disclosure, the pixel circuitry includes a driving circuitry 90, a light-emission control circuitry 91, a first resetting circuitry 92, a second resetting circuitry 93, a data writing circuitry 94, an energy storage circuitry 95, a compensation circuitry 96 and a light-emitting element L1.

The light-emission control circuitry 91 is electrically coupled to the light-emission control line E1, a third voltage end V3, a first end of the driving circuitry 90, a second end of the driving circuitry 90 and a first electrode of the light-emitting element L1, and configured to enable the third voltage end V3 to be electrically coupled to the first end of the driving circuitry 90 under the control of the light-emission control signal provided by the light-emission control line E1 and enable the second end of the driving circuitry 90 to be electrically coupled to the first electrode of the light-emitting element L1.

The first resetting circuitry 92 is electrically coupled to the first resetting control line R01, the first electrode of the light-emitting element L1 and a first initial voltage end, and configured to write a first initial voltage V01 into the first electrode of the light-emitting element L1 under the control of the first resetting control signal from the first resetting control line, and the first initial voltage end is configured to provide the first initial voltage V01.

The second resetting circuitry 93 is electrically coupled to a second resetting control line R02, a control end of the driving circuitry 90 and a second initial voltage end, and configured to write a second initial voltage V02 into the control end of the driving circuitry 90 under the control of a second resetting control signal from the second resetting control line R02, and the second initial voltage end V02 is configured to provide the second initial voltage.

The data writing circuitry 94 is electrically coupled to the gate line G1, the data line D1, and the first end of the driving circuitry 90, and configured to write a data voltage on the data line D1 into the first end of the driving circuitry 90 under the control of a gate driving signal from the gate line G1.

The compensation circuitry 96 is electrically coupled to the gate line G1, the control end of the driving circuitry 90, and the second end of the driving circuitry 90, and is configured to enable the control end of the driving circuitry to be electrically coupled to or electrically decoupled from the second end of the driving circuitry under the control of the gate driving signal.

The driving circuitry 90 is configured to generate a driving current in accordance with a potential at the control end of the driving circuitry.

The energy storage circuitry 95 is electrically coupled to the control end of the driving circuitry 90, and configured to maintain the potential at the control end of the driving circuitry 90.

In the embodiments of the present disclosure, the first initial voltage V01 is an anode resetting voltage, and the second initial voltage V02 is a resetting voltage.

Figure 10:
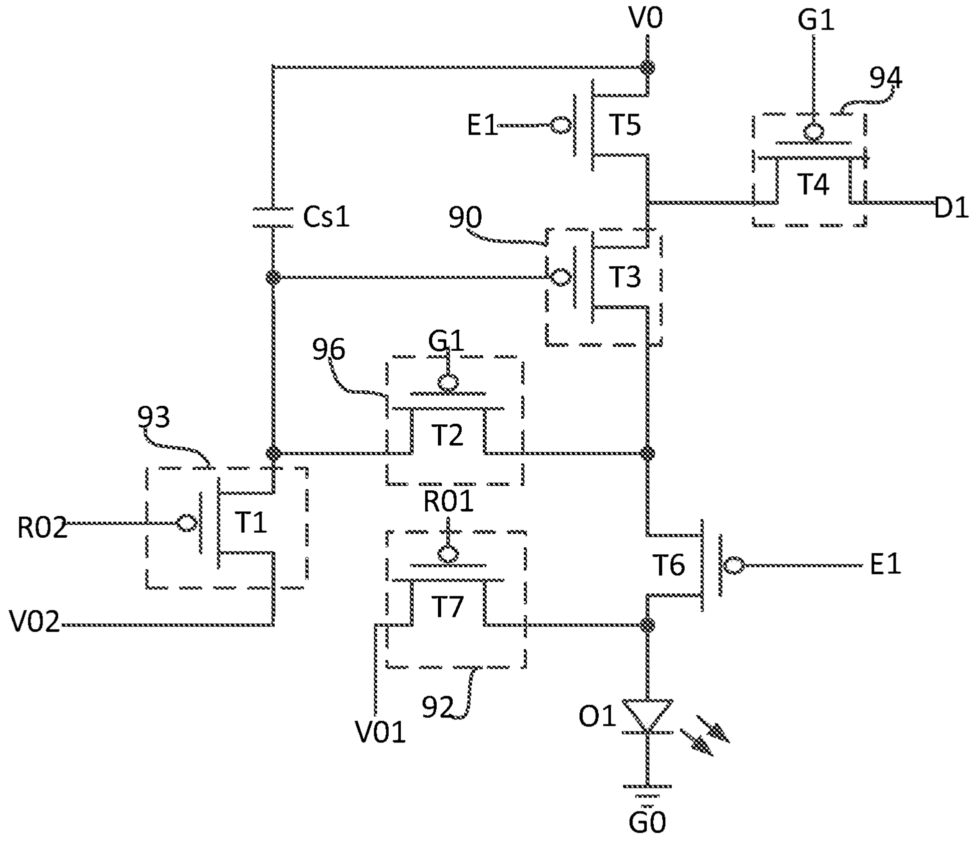
FIG. 10 is a circuit diagram of the pixel circuitry in the display device according to one embodiment of the present disclosure.

As shown in FIG. 10, based on the pixel circuitry in FIG. 9, the driving circuitry 90 includes the third transistor T3, the light-emission control circuitry includes the fifth transistor T5 and the sixth transistor T6, the first resetting circuitry 92 includes the seventh transistor T7, the second resetting circuitry 93 includes the second reset transistor T1, the data writing circuitry 94 includes the fourth transistor T4, the energy storage circuitry includes the first storage capacitor Cs1, the compensation circuitry 96 includes the second transistor T2, and the light-emitting element is an organic light-emitting diode O1. A gate electrode of T5 is electrically coupled to E1, and a source electrode of T5 is configured to receive the power supply voltage V0; a source electrode of T3 is electrically coupled to a drain electrode of T5, a drain electrode of T3 is electrically coupled to a source electrode of T6, a drain electrode of T6 is electrically coupled to an anode electrode of O1, a gate electrode of T6 is electrically coupled to E1, and a cathode of O1 is electrically coupled to the grounded end G0. A gate electrode of T3 is electrically coupled to a first end of Cs1, and a second end of Cs1 is configured to receive the power supply voltage V0. A gate electrode of T4 is electrically coupled to G1, a source electrode of T4 is electrically coupled to D1, and a drain electrode of T4 is electrically coupled to a source electrode of T3. A gate electrode of T2 is electrically coupled to G1, a source electrode of T2 is electrically coupled to a gate electrode of T3, and a drain electrode of T2 is electrically coupled to a drain electrode of T3. A gate electrode of T1 is electrically coupled to R02, a drain electrode of T1 is electrically coupled to a gate electrode of T3, and a source electrode of T1 is configured to receive the second initial voltage V02. A gate electrode of T7 is electrically coupled to R01, a drain electrode of T7 is electrically coupled to the anode of O1, and a source electrode of T7 is configured to receive the first initial voltage V01.

In the embodiments of the present disclosure, as shown in FIG. 10, V01 is the anode resetting voltage. When the pixel circuitry is a red pixel circuitry, V01 is a red anode resetting voltage; when the pixel circuitry is a green pixel circuitry, V01 is a green anode resetting voltage; and when the pixel circuitry is a blue pixel circuitry, V01 is a blue anode resetting voltage.

In the embodiments of the present disclosure, as shown in FIG. 10, all the transistors are, but not limited to, PMOS transistors.

Figure 11:
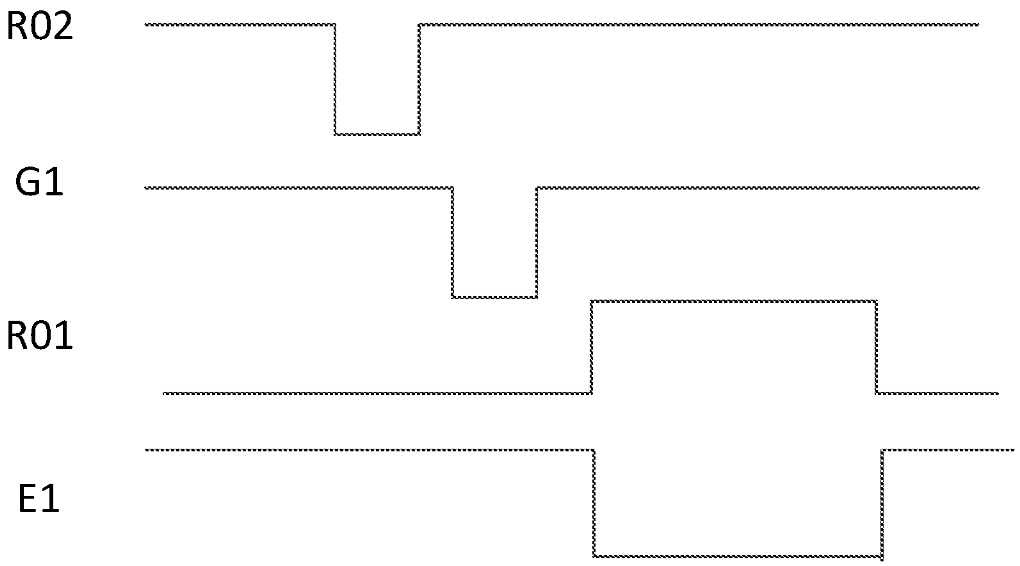
FIG. 11 is a sequence diagram of the pixel circuitry in FIG. 10.

As shown in FIG. 11, in the embodiments of the present disclosure, during the operation of the pixel circuitry in FIG. 10, when R01 provides the low voltage signal, V01 is written into the anode of O1. When R02 provides the low voltage signal, V02 is written into the gate electrode of T3. When G1 provides the low voltage signal, a data voltage Vd across D1 is written into the source electrode of T3, and T2 is turned on, so as to change the potential at the gate electrode of T3 to Vd+Vth3, where Vth3 is a threshold voltage of T3, thereby to write the data voltage and compensate the threshold voltage. When E1 provides the low voltage signal, T5 and T6 are turned on, and T3 drives O1 to emit light.

The display device may be any product or member having a display function, such as a mobile phone, a tablet computer, a television, a monitor, a laptop computer, a digital photo frame, or a navigator.

The above embodiments are for illustrative purposes only, it should be appreciated that, a person skilled in the art may make further modifications and improvements without departing from the spirit of the present disclosure, and these modifications and improvements shall also fall within the scope of the present disclosure.

What is claimed is:

1. A resetting control signal generation circuitry for prolonging service life of a display device light emitting element having an anode, by turning on the circuitry when a light-emission control transistor is turned off, and turning off the circuitry when the light-emission control transistor is turned on, to maintain a voltage sufficiently long for resetting the anode, the circuitry comprising a resetting control signal output, a first node control circuitry, a second node control circuitry, a first output circuitry and a second output circuitry, wherein the first node control circuitry is configured to control a potential at a first node and maintain the potential at the first node;

the second node control circuitry is configured to control a potential at a second node and maintain the potential at the second node;

the first output circuitry is electrically coupled to the first node, the resetting control signal output and a first voltage, and configured to enable the resetting control signal output to be electrically coupled to or electrically decoupled from the first voltage under the control of the potential at the first node;

the second output circuitry is electrically coupled to the second node, the resetting control signal output and a second voltage, and configured to enable the resetting control signal output to be electrically coupled to or electrically decoupled from the second voltage under the control of the potential at the second node, and the first output circuitry comprises a first output transistor and an output capacitor;

a control electrode of the first output transistor is electrically coupled to the first node, a first electrode of the first output transistor is electrically coupled to the first voltage, and a second electrode of the first output transistor is electrically coupled to the resetting control signal output;

a first terminal of the output capacitor is electrically coupled to the first node, and a second terminal of the output capacitor is electrically coupled to the first voltage;

the second output circuitry comprises a second output transistor, a control electrode of the second output transistor is electrically coupled to the second node, a first electrode of the second output transistor is electrically coupled to the resetting control signal output, and a second electrode of the second output transistor is electrically coupled to the second voltage; and the first voltage is a low voltage, and the second voltage is a high voltage;

wherein the first node control circuitry is electrically coupled to a first clock signal, a second clock signal, the first node, the second node, a third node, the first voltage and the second voltage, and configured to control a potential at the third node in accordance with a first voltage signal and the first clock signal under the control of the first clock signal and the potential at the second node, control the potential at the first node in accordance with a second voltage signal under the control of the potential at the third node, a second clock signal and the potential at the second node, and maintain the potential at the first node;

the first voltage is configured to provide the first voltage signal, the second voltage is configured to provide the second voltage signal;

the second node control circuitry is electrically coupled to the third node, the first clock signal, an initial voltage, the second clock signal, the second node and the second voltage, and configured to control the potential at the second node in accordance with the second clock signal, an initial voltage signal and the second voltage signal under the control of the first clock signal, the second clock signal, and the potential at the third node; and the initial voltage is configured to provide the initial voltage signal;

wherein the first node control circuitry comprises a third node control sub-circuitry, a fourth node control sub-circuitry, and a first node control sub-circuitry;

the third node control sub-circuitry is electrically coupled to the first clock signal, the first voltage, the second node, and the third node, and configured to write the first voltage signal into the third node under the control of the first clock signal and write the first clock signal into the third node under the control of the potential at the second node;

the fourth node control sub-circuitry is electrically coupled to the third node, the fourth node and the second clock signal, and configured to write the second clock signal into the fourth node under the control of the potential at the third node and control a potential at the fourth node in accordance with the potential at the third node; and the first node control sub-circuitry is electrically coupled to the fourth node, the second clock signal and the first node, and configured to enable the fourth node to be electrically coupled to or electrically decoupled from and the first node under the control of the second clock signal and maintain the potential at the first node.

2. The resetting control signal generation circuitry according to claim 1, wherein the third node control sub-circuitry comprises a first control transistor and a second control transistor;

a control electrode of the first control transistor is electrically coupled to the first clock signal, a first electrode of the first control transistor is electrically coupled to the first voltage, and a second electrode of the first control transistor is electrically coupled to the third node; and a control electrode of the second control transistor is electrically coupled to the second node, a first electrode of the second control transistor is electrically coupled to the third node, and a second electrode of the second control transistor is electrically coupled to the first clock signal.

3. The resetting control signal generation circuitry according to claim 1, wherein the fourth node control sub-circuitry comprises a third control transistor and a first capacitor;

a control electrode of the third control transistor is electrically coupled to the third node, a first electrode of the third control transistor is electrically coupled to the second clock signal, and a second electrode of the third control transistor is electrically coupled to the fourth node; and a first terminal of the first capacitor is electrically coupled to the third node, and a second terminal of the first capacitor is electrically coupled to the fourth node.

4. The resetting control signal generation circuitry according to claim 1, wherein the first node control sub-circuitry comprises a fourth control transistor and a fifth control transistor;

a control electrode of the fourth control transistor is electrically coupled to the second clock signal, a first electrode of the fourth control transistor is electrically coupled to the fourth node, and a second electrode of the fourth control transistor is electrically coupled to the first node; and a control electrode of the fifth control transistor is electrically coupled to a second node, a first electrode of the fifth control transistor is electrically coupled to the first node, and a second electrode of the fifth control transistor is electrically coupled to the second voltage.

5. The resetting control signal generation circuitry according to claim 1, wherein the second node control circuitry comprises a sixth control transistor, a seventh control transistor, an eighth control transistor and a third capacitor;

a control electrode of the sixth control transistor is electrically coupled to the first clock signal, a first electrode of the sixth control transistor is electrically coupled to the initial voltage, and a second electrode of the sixth control transistor is electrically coupled to the second node;

a control electrode of the seventh control transistor is electrically coupled to the third node, and a first electrode of the seventh control transistor is electrically coupled to the second voltage;

a control electrode of the eighth control transistor is electrically coupled to the second clock signal, a first electrode of the eighth control transistor is electrically coupled to a second electrode of the seventh control transistor, and a second electrode of the eighth control transistor is electrically coupled to the second node; and a first terminal of the third capacitor is electrically coupled to the second node, and a second terminal of the third capacitor is electrically coupled to the second clock signal.

6. A resetting control signal generation method for a resetting control signal generation circuitry, wherein the resetting control signal generation circuitry comprises a resetting control signal output, a first node control circuitry, a second node control circuitry, a first output circuitry and a second output circuitry, wherein the first node control circuitry is configured to control a potential at a first node and maintain the potential at the first node;

the second node control circuitry is configured to control a potential at a second node and maintain the potential at the second node;

the first output circuitry is electrically coupled to the first node, the resetting control signal output and a first voltage, and configured to enable the resetting control signal output to be electrically coupled to or electrically decoupled from the first voltage under the control of the potential at the first node;

the second output circuitry is electrically coupled to the second node, the resetting control signal output and a second voltage, and configured to enable the resetting control signal output to be electrically coupled to or electrically decoupled from the second voltage under the control of the potential at the second node, and the first output circuitry comprises a first output transistor and an output capacitor;

a control electrode of the first output transistor is electrically coupled to the first node, a first electrode of the first output transistor is electrically coupled to the first voltage, and a second electrode of the first output transistor is electrically coupled to the resetting control signal output;

a first terminal of the output capacitor is electrically coupled to the first node, and a second terminal of the output capacitor is electrically coupled to the first voltage;

the second output circuitry comprises a second output transistor, a control electrode of the second output transistor is electrically coupled to the second node, a first electrode of the second output transistor is electrically coupled to the resetting control signal output, and a second electrode of the second output transistor is electrically coupled to the second voltage; and the first voltage is a low voltage, and the second voltage is a high voltage;

wherein the first node control circuitry is electrically coupled to a first clock signal, a second clock signal, the first node, the second node, a third node, the first voltage and the second voltage, and configured to control a potential at the third node in accordance with a first voltage signal and a first clock signal under the control of the first clock signal and the potential at the second node, control the potential at the first node in accordance with a second voltage signal under the control of the potential at the third node, a second clock signal and the potential at the second node, and maintain the potential at the first node;

the first voltage is configured to provide the first voltage signal, the second voltage is configured to provide the second voltage signal;

the second node control circuitry is electrically coupled to the third node, the first clock signal, an initial voltage, the second clock signal, the second node and the second voltage, and configured to control the potential at the second node in accordance with the second clock signal, an initial voltage signal and the second voltage signal under the control of the first clock signal, the second clock signal, and the potential at the third node; and the initial voltage is configured to provide the initial voltage signal;

wherein the first node control circuitry comprises a third node control sub-circuitry, a fourth node control sub-circuitry, and a first node control sub-circuitry;

the third node control sub-circuitry is electrically coupled to the first clock signal, the first voltage, the second node, and the third node, and configured to write the first voltage signal into the third node under the control of the first clock signal and write the first clock signal into the third node under the control of the potential at the second node;

the fourth node control sub-circuitry is electrically coupled to the third node, the fourth node and the second clock signal, and configured to write the second clock signal into the fourth node under the control of the potential at the third node and control a potential at the fourth node in accordance with the potential at the third node; and the first node control sub-circuitry is electrically coupled to the fourth node, the second clock signal and the first node, and configured to enable the fourth node to be electrically coupled to or electrically decoupled from and the first node under the control of the second clock signal and maintain the potential at the first node;

the resetting control signal generation method comprises:

controlling, by the first node control circuitry, the potential at the first node and maintaining the potential at the first node;

controlling, by the second node control circuitry, the potential at the second node and maintaining the potential at the second node;

enabling, by the first output circuitry, the resetting control signal output to be electrically coupled to or electrically decoupled from the first voltage under the control of the potential at the first node; and enabling, by the second output circuitry, the resetting control signal output to be electrically coupled to or electrically decoupled from the second voltage under the control of the potential at the second node.

7. A resetting control signal generation module, comprising a multi-level resetting control signal generation circuitry for prolonging service life of a display device light emitting element having an anode, by turning on the circuitry when a light-emission control transistor is turned off, and turning off the circuitry when the light-emission control transistor is turned on, to maintain a voltage sufficiently long for resetting the anode, wherein the resetting control signal generation circuitry comprises a resetting control signal output, a first node control circuitry, a second node control circuitry, a first output circuitry and a second output circuitry, wherein the first node control circuitry is configured to control a potential at a first node and maintain the potential at the first node;

the second node control circuitry is configured to control a potential at a second node and maintain the potential at the second node;

the first output circuitry is electrically coupled to the first node, the resetting control signal output and a first voltage, and configured to enable the resetting control signal output to be electrically coupled to or electrically decoupled from the first voltage under the control of the potential at the first node;

the second output circuitry is electrically coupled to the second node, the resetting control signal output and a second voltage, and configured to enable the resetting control signal output to be electrically coupled to or electrically decoupled from the second voltage under the control of the potential at the second node, and the first output circuitry comprises a first output transistor and an output capacitor;

a control electrode of the first output transistor is electrically coupled to the first node, a first electrode of the first output transistor is electrically coupled to the first voltage, and a second electrode of the first output transistor is electrically coupled to the resetting control signal output;

a first terminal of the output capacitor is electrically coupled to the first node, and a second terminal of the output capacitor is electrically coupled to the first voltage;

the second output circuitry comprises a second output transistor, a control electrode of the second output transistor is electrically coupled to the second node, a first electrode of the second output transistor is electrically coupled to the resetting control signal output, and a second electrode of the second output transistor is electrically coupled to the second voltage; and the first voltage is a low voltage, and the second voltage is a high voltage;

wherein the first node control circuitry is electrically coupled to a first clock signal, a second clock signal, the first node, the second node, a third node, the first voltage and the second voltage, and configured to control a potential at the third node in accordance with a first voltage signal and a first clock signal under the control of the first clock signal and the potential at the second node, control the potential at the first node in accordance with a second voltage signal under the control of the potential at the third node, a second clock signal and the potential at the second node, and maintain the potential at the first node;

the first voltage is configured to provide the first voltage signal, the second voltage is configured to provide the second voltage signal;

the second node control circuitry is electrically coupled to the third node, the first clock signal, an initial voltage, the second clock signal, the second node and the second voltage, and configured to control the potential at the second node in accordance with the second clock signal, an initial voltage signal and the second voltage signal under the control of the first clock signal, the second clock signal, and the potential at the third node; and the initial voltage is configured to provide the initial voltage signal;

wherein the first node control circuitry comprises a third node control sub-circuitry, a fourth node control sub-circuitry, and a first node control sub-circuitry;

the third node control sub-circuitry is electrically coupled to the first clock signal, the first voltage, the second node, and the third node, and configured to write the first voltage signal into the third node under the control of the first clock signal and write the first clock signal into the third node under the control of the potential at the second node;

the fourth node control sub-circuitry is electrically coupled to the third node, the fourth node and the second clock signal, and configured to write the second clock signal into the fourth node under the control of the potential at the third node and control a potential at the fourth node in accordance with the potential at the third node; and the first node control sub-circuitry is electrically coupled to the fourth node, the second clock signal and the first node, and configured to enable the fourth node to be electrically coupled to or electrically decoupled from and the first node under the control of the second clock signal and maintain the potential at the first node.

8. A display device, comprising the resetting control signal generation module according to claim 7.

9. The display device according to claim 8, further comprising a light-emission control signal generation module and a plurality of pixel circuitries arranged in rows and columns, wherein each pixel circuitry is electrically coupled to a light-emission control line and a first resetting control line, and the light-emission control signal generation module is configured to provide a light-emission control signal to the pixel circuitry, the resetting control signal generation module is configured to provide a first resetting control signal to the pixel circuitry, and the first resetting control signal is in inverse phase with the light-emission control signal.

10. The display device according to claim 9, wherein the pixel circuitry comprises a driving circuitry, a light-emission control circuitry, a first resetting circuitry, a second resetting circuitry, a data writing circuitry, an energy storage circuitry, a compensation circuitry and a light-emitting element;

the light-emission control circuitry is electrically coupled to the light-emission control line, a third voltage, a first terminal of the driving circuitry, a second terminal of the driving circuitry and a first electrode of the light-emitting element, and configured to enable the third voltage to be electrically coupled to the first terminal of the driving circuitry and enable the second terminal of the driving circuitry to be electrically coupled to the first electrode of the light-emitting element under the control of the light-emission control signal from the light-emission control line;

the first resetting circuitry is electrically coupled to the first resetting control line, the first electrode of the light-emitting element and a first initial voltage, and configured to write a first initial voltage into the first electrode of the light-emitting element under the control of the first resetting control signal provided by the first resetting control line, and the first initial voltage is configured to provide the first initial voltage;

the second resetting circuitry is electrically coupled to a second resetting control line, a control terminal of the driving circuitry and a second initial voltage, and configured to write a second initial voltage into the control terminal of the driving circuitry under the control of a second resetting control signal from the second resetting control line, and the second initial voltage is configured to provide the second initial voltage;

the data writing circuitry is configured to write a data voltage into the first terminal of the driving circuitry under the control of a gate driving signal;

the compensation circuitry is configured to enable the control terminal of the driving circuitry to be electrically coupled to or electrically decoupled from the second terminal of the driving circuitry under the control of the gate driving signal;

the driving circuitry is configured to generate a driving current in accordance with a potential at the control terminal of the driving circuitry; and the energy storage circuitry is configured to maintain the potential at the control terminal of the driving circuitry.

11. The resetting control signal generation module according to claim 7, wherein the third node control sub-circuitry comprises a first control transistor and a second control transistor;

a control electrode of the first control transistor is electrically coupled to the first clock signal, a first electrode of the first control transistor is electrically coupled to the first voltage, and a second electrode of the first control transistor is electrically coupled to the third node; and a control electrode of the second control transistor is electrically coupled to the second node, a first electrode of the second control transistor is electrically coupled to the third node, and a second electrode of the second control transistor is electrically coupled to the first clock signal.

12. The resetting control signal generation module according to claim 7, wherein the fourth node control sub-circuitry comprises a third control transistor and a first capacitor;

a control electrode of the third control transistor is electrically coupled to the third node, a first electrode of the third control transistor is electrically coupled to the second clock signal, and a second electrode of the third control transistor is electrically coupled to the fourth node; and a first terminal of the first capacitor is electrically coupled to the third node, and a second terminal of the first capacitor is electrically coupled to the fourth node.

13. The resetting control signal generation module according to claim 7, wherein the first node control sub-circuitry comprises a fourth control transistor and a fifth control transistor;

a control electrode of the fourth control transistor is electrically coupled to the second clock signal, a first electrode of the fourth control transistor is electrically coupled to the fourth node, and a second electrode of the fourth control transistor is electrically coupled to the first node; and a control electrode of the fifth control transistor is electrically coupled to a second node, a first electrode of the fifth control transistor is electrically coupled to the first node, and a second electrode of the fifth control transistor is electrically coupled to the second voltage.

14. The resetting control signal generation module according to claim 7, wherein the second node control circuitry comprises a sixth control transistor, a seventh control transistor, an eighth control transistor and a third capacitor;

a control electrode of the sixth control transistor is electrically coupled to the first clock signal, a first electrode of the sixth control transistor is electrically coupled to the initial voltage, and a second electrode of the sixth control transistor is electrically coupled to the second node;

a control electrode of the seventh control transistor is electrically coupled to the third node, and a first electrode of the seventh control transistor is electrically coupled to the second voltage;

a control electrode of the eighth control transistor is electrically coupled to the second clock signal, a first electrode of the eighth control transistor is electrically coupled to a second electrode of the seventh control transistor, and a second electrode of the eighth control transistor is electrically coupled to the second node; and a first terminal of the third capacitor is electrically coupled to the second node, and a second terminal of the third capacitor is electrically coupled to the second clock signal.

* * * * *